United States Patent [19] [11] Patent Number: 5,996,017
Cipiere [45] Date of Patent: Nov. 30, 1999

[54] METHOD FOR INFORMATION EXCHANGE IN THE CUSTOMER/SERVER MODE BETWEEN STATIONS CONNECTED BY A COMMUNICATION NETWORK

[75] Inventor: Patrick Cipiere, Antibes, France

[73] Assignee: Inria Institut National de Recherche en Infomatique et en Automatique, Le Chesnay, France

[21] Appl. No.: 08/849,855

[22] PCT Filed: Dec. 7, 1995

[86] PCT No.: PCT/FR95/01623

§ 371 Date: Jun. 12, 1997

§ 102(e) Date: Jun. 12, 1997

[87] PCT Pub. No.: WO96/18959

PCT Pub. Date: Jun. 20, 1996

[30] Foreign Application Priority Data

Dec. 13, 1994 [FR] France ................................. 94 15013

[51] Int. Cl.[6] ................ G06F 15/00; G06F 13/00
[52] U.S. Cl. .................. 709/229; 709/203; 709/216; 709/222; 395/500; 395/527; 395/595; 395/670; 364/468.03; 370/408; 370/404
[58] Field of Search ....................... 709/219, 250, 709/229, 222, 203; 379/88.22; 370/408, 404; 395/500, 527, 595, 670; 359/118, 178, 121; 364/468.03

[56] References Cited

U.S. PATENT DOCUMENTS 5,426,747  6/1995  Weinreb et al. ..................... 395/400
5,600,644  2/1997  Chang et el. ....................... 370/404
5,615,373  3/1997  Ho ...................................... 395/726
5,740,231  4/1998  Cohn et al. .......................... 379/89

FOREIGN PATENT DOCUMENTS 0 566 895  10/1993  European Pat. Off. ...... G06F 15/403

OTHER PUBLICATIONS

R. Alonso et al., "Using Stashing to Increase Node Autonomy in Distributed File Systems", Proceedings of the Symposium on Reliable Distributed Systems, IEEE, SYMP. Oct. 9, 1990, pp. 12–21.

B. Liskov et al., "A Replicated Unix File System", Operating Systems Review (SIGOPS), vol. 25, No. 1, Jan. 1, 1991, pp. 60–64.

Primary Examiner—Frank J. Asta
Assistant Examiner—Beatriz Prieto
Attorney, Agent, or Firm—Foley & Lardner

[57] ABSTRACT

A method for information exchange in the customer/server mode between stations connected by a communication network is described. An emulated server (SEM) is provided at at least certain stations. The emulated server is appropriate for dialog according to a communication protocol to process requests for consulting resource files at a coupler between a station and the network. An interception mechanism (INT) is used to intercept the requests for consulting the resource files by redirecting them to the local emulated server. The emulated server is used either as a cache memory to reduce traffic or as a switch to mitigate and remedy a breakdown of the server.

10 Claims, 4 Drawing Sheets

METHOD FOR INFORMATION EXCHANGE IN THE CUSTOMER/SERVER MODE BETWEEN STATIONS CONNECTED BY A COMMUNICATION NETWORK

BACKGROUND OF THE INVENTION

The present invention relates to the technical field of information exchange in client-server mode between stations connected by a communication network.

It finds general application in a method in which:

a) a network is formed by a communication hub and a plurality of stations, each associated with a coupler on the said hub, b) at least one server-station is arranged on the network, and c) each coupler is provided with a network communication protocol, allowing the processing of requests for consulting a resource file between certain stations known as client-stations and the server-station.

In a general way, the server allows access to the files for the clients who make the request. The server is a machine which stores in a unique and central manner a large number of files to reduce the cost of implementation (a single memory) and to simplify the administration of the files (a single area for retrieval).

There is a known communication protocol called NFS for Network File System (system of files on network), developed by the U.S. Company SUN MICROSYSTEMS, INC, in which the server offers for sharing by the clients a number of files stored according to a chosen branched chain of the files.

In this protocol, the branched chain of files is constructed by identifying in a one-to-one way each file by means of a label, also called "a file handle". This identification is made by the server. In practice, a client who wishes to access a file in the branched chain first of all requires the label of the root of the branched chain (root file handle).

The server does not keep track of distribution of the files (information and data) to the clients (stateless). In these conditions, it cannot inform the clients about modifications made to the files at the server. As a result, the clients interrogate the server regularly to verify that the data and information they have in their memory is up-to-date.

This results in important but wasteful traffic insofar as the centralised files on the server are very stable.

Further the interruption in service offered by the server for example in the case of its breakdown, directly influences the proper functioning of the clients, and with so much more severity and sharpness if, as is often the case, the centralised files are critical for the functioning of the said clients.

It should be noted that in the majority of cases, rebooting of the server secures, without any other intervention, normal recovery of the activity of the clients. Nevertheless, certain events, such as the changing on the server of a disc holding centralised files, are not transparent to the clients. In effect, the file labels depend in general on the position of the files on the central holding disc. As a result, the change of position of files at the server makes the labels already distributed to the clients wrong, and necessitates their correction.

One solution could consist of modifying the communication protocol to remedy these drawbacks. However, this would be difficult to envisage, insofar as the modifications could destroy the interoperability of the said protocol.

SUMMARY OF THE INVENTION

The aim of the invention is to provide a solution to the above identified problems without destroying the interoperability of the communication protocol.

Another aim of the invention is to provide an easy and simple method of implementation, without needing any modification of the existing software layers managing the communication protocol, in particular the NFS protocol.

This result is obtained by the method described above, and which is characterised by the fact that it comprises the following steps:

d) at at least certain stations, d1) maintaining locally an auxiliary file representing a correspondence between a designation of a resource file and on one hand a substitute location of it and on the other hand a condition key for use by the substitute location, d2) providing an emulated server able to communicate according to the said protocol for processing the requests for consulting a resource file, d3) at the coupler between the station and the network providing a mechanism for intercepting the requests for consulting a resource file by re-directing them to the local emulated server, d4) at the emulated server, accessing the auxiliary file and receiving the intercepted requests, for:

if the said condition key for the desired file is correct, processing the request with the substitute location, if not, directing to the server station a derived request to obtain access to the desired file.

Such a method has the advantage that in a general way it protects the clients against a breakdown of the server in a client-server environment, while maintaining the interoperability of the communication protocol.

According to one particular mode of implementation of the method according to the invention, it comprises further the following steps:

i) at the server-station ordering the resource files according to a chosen branched chain, ii) at the emulated server, storing at least a part of the resource files in their respective substitute location according to the chosen branched chain, iii) defining the condition key for use by the substitute location of a resource file according to the availability and the obsolescence of the said resource file, iv) maintaining the auxiliary file at the server-station, with regard to every modification made to the resource files stored at the server-station, vi) providing data exchanges on the network, at the initiative of the client station, for consulting the auxiliary file of the server station and for retrieving the substitute locations from the or each emulated server in accordance with the state of the said auxiliary file.

It should be noted that in this particular mode of implementation of the invention, the emulated server plays the part of a cache memory in such a way as to improve the performance of the network by reducing the number of requests to the server. The auxiliary file here plays the part of a synchronising file for identifying every modification made to the files on the server side, and recalling the files stored on the emulated server.

According to another mode of implementation of the method according to the invention, it comprises further the following steps:

i) at the server-station, ordering the resource files according to a chosen branched chain, ii) providing at least one additional server-station and storing on it at least a part of the resource files in their respective substitute location according to the chosen branched chain, iii) defining the condition key for use by the substitute location of a resource file according to the absence/presence of a correspondence between the substitute location and the designation of the resource file, and iv) maintaining the auxiliary file at the emulated server, with respect to every modification made to the correspondence between the substitute location and the designation of each resource file.

It should be noted that in this particular mode of use, the emulated server plays the part of a switch by directing the requests for consultation of the file to an available server, which allows improvement of the reliability of the network. The auxiliary file here plays the part of a correspondence table for directing all requests for consulting a file to an available server.

BRIEF DESCRIPTION OF THE DRAWINGS

Other characteristics and advantages of the invention will appear in the light of the detailed description below and the accompanying drawings in which.

DETAILED DESCRIPTION OF THE PREFERRED EMBODIMENTS

Figure 1:
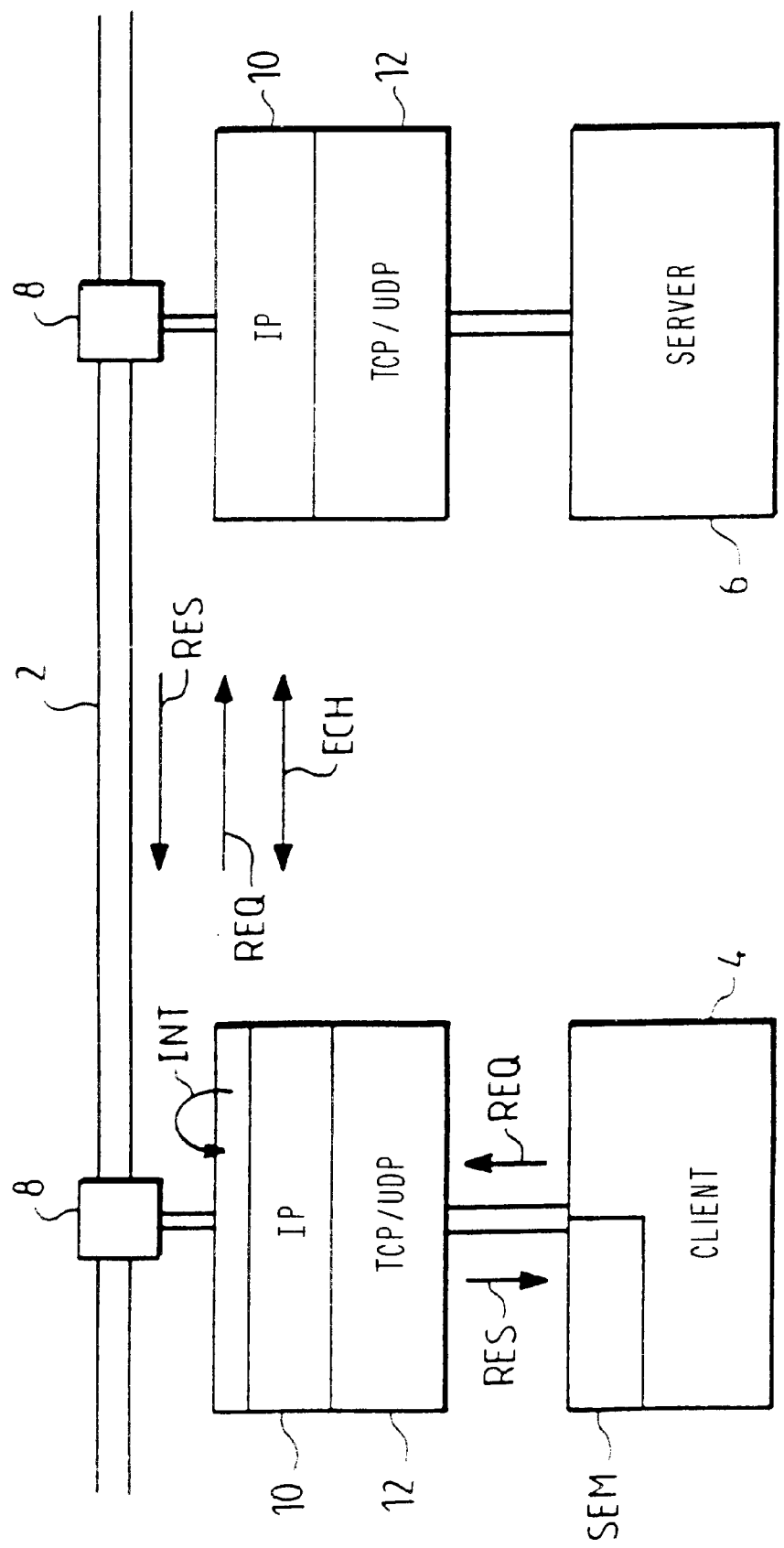
FIG. 1 is a block diagram showing the communication network in which the method according to the invention is used.

The apparatus in which the method of the invention is used is shown in FIG. 1. It relates to a network formed by a communication hub 2, for example of the type ETHERNET (registered trade mark) and a plurality of stations 4, 6 each associated with a coupler 8 on the said hub. For example, the station 6 is here a server-station.

Each coupler 8 is provided with a network communication protocol allowing the processing of requests for consulting resource files between certain stations called client stations and the server-station.

Each station 4, 6 for communication in the client/server environment has software layers 10 of the type IP for "INTERNET PROTOCOL", and 12 of the type TCP/UDP for "Transmission Control Protocol/User Datagram Protocol".

The client-station 4 has a mass memory (not shown) of the order of 500 megabytes. For its part, the server-station has a mass memory of the order of 8 gigabytes. Random access memory (not shown) of 6 to 32 megabytes is also provided at each station.

The server allows access to files stored in the mass memory of the server and waits for the requests REQ coming from the clients. The server processes these requests REQ and sends the response RES to the clients through the communication hub 2. Data exchanges ECH are provided for setting and functioning of the client/server mode. The couplers allow the switching of messages from the clients to the servers and vice versa.

The method according to the invention finds application particularly in the communication protocol called NFS and in which the server offers for sharing by its clients a plurality of files ordered according to a file branched chain known in information technology based on a root and indexed directories.

In this protocol the branched chain of the files is constructed by identifying in an one-to-one way each file by a label, also called "file handle". This identification is made by the server. The mechanisms for constituting this label are characteristic of the server. It is therefore very difficult for another machine to generate in a reliable way identical labels to those of the server.

A client who wishes to access a file of the branched chain offered by the server first of all requires the file handle of the root of the branched chain: the root file handle.

The request which obtains this root file handle has the characteristic of being the only one which does not rely on another file handle. All the other requests run on the basis of a file handle obtained at the time of a previous request.

There are four distinct sorts of requests in the NFS protocol. The first category of requests is that called "look-up" which allows a request for the file handle of a file of which the name and the file handle of the directory which contains it are known. It is this request which allows apprehension of the organisation of the branched chain.

The second category of requests is that known as "readlink" which allows a request for the name of a link contained in a file of which the file handle is known.

The third category of requests is that called "getattr" which allows a request for information on the state or attributes of a file of which the file handle is known.

Finally the fourth category of requests is that called "read" which allows a request for a block of data in a file of which the file handle is known.

The server does not keep track of distribution of the files, information and data, to the client destinations. In these conditions, it cannot inform the clients about modifications made to the files stored on the server. As a result, the clients interrogate the server regularly to verify that the data and information they have in their memory are up-to-date.

This results in important but wasteful traffic insofar as the centralised files on the server have the property of being very stable.

Further, the break in service offered by the server for example in the case of its failure, directly influences the proper functioning of the clients, and this with so much more severity and sharpness, if as is often the case, the centralised files are critical for the functioning of the said clients.

It should be noted that in the majority of cases, rebooting of the server secures, without any other intervention, normal recovery of the activity of the clients. Nevertheless, certain events, such as the changing on the server of a disc holding the centralised files, are not transparent to the clients. In effect, the file labels depend in general on the position of the files on the central holding disc. As a result, the change of position of the files at the server makes the labels already distributed to the clients wrong, and necessitates their correction.

The NFS service or protocol does not propose any mechanism for protecting the client against such incidents, for example a failure of the server.

The method according to the invention solves these problems while maintaining the interoperability of the NFS protocol.

The general solution according to the invention comprises in particular:

providing an emulated server at at least certain stations 4, the said emulated server being able to communicate according to said protocol for processing the requests for consulting the resource file at the coupler between the station and the network, using the mechanism for intercepting the requests for consulting the resource file available in the IP protocol, by re-directing them to the local emulated server, and making the emulated server play the part, either of a cache memory for reducing traffic, or a switch for mitigating server failure.

Figure 2:
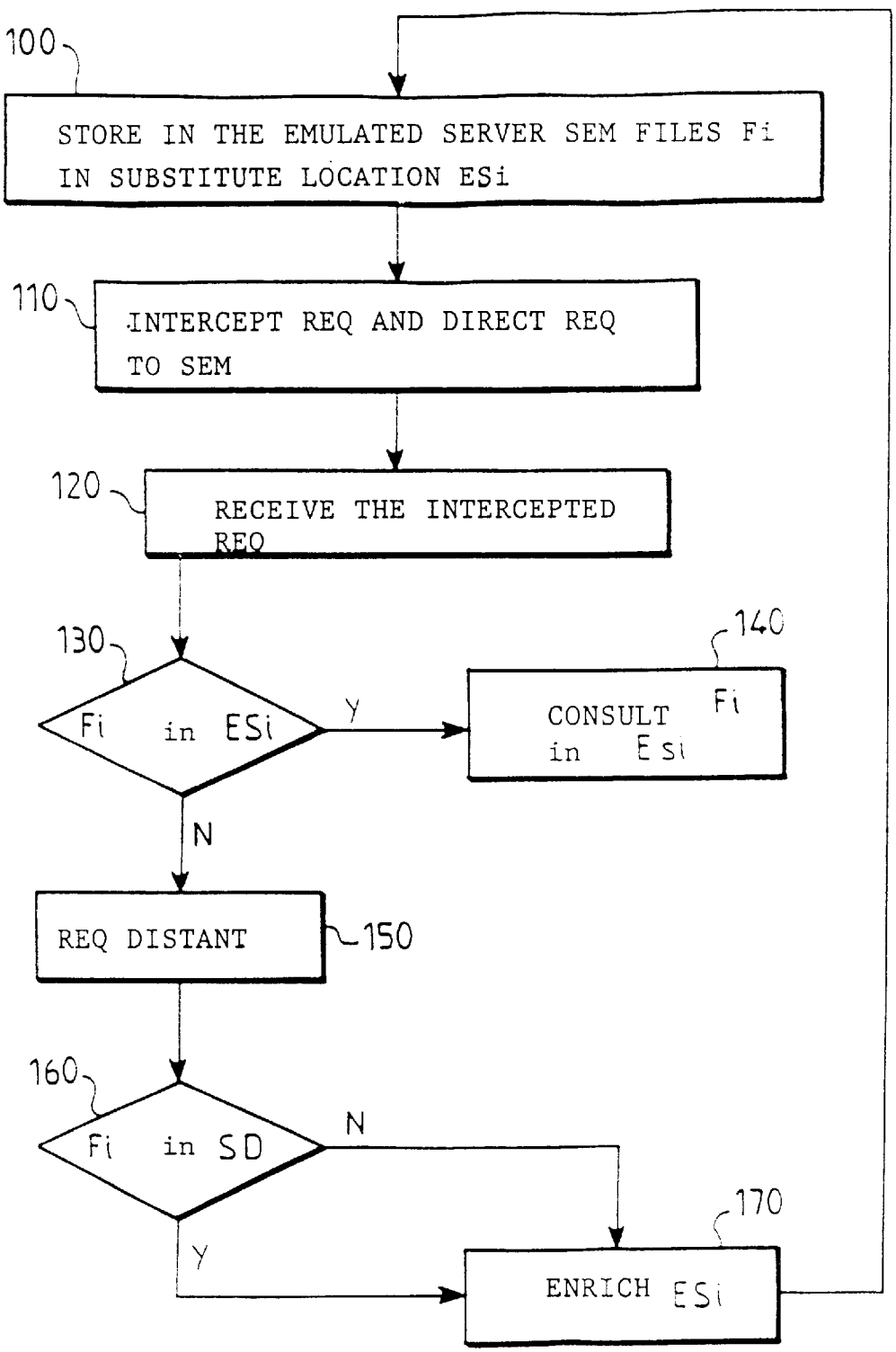
FIG. 2 is a flow chart showing the steps of the method by the client, in the case where the emulated server plays the part of cache memory.

With reference to FIG. 2, the emulated server SEM is able to store at once (step 100) at least a part of the resource files Fi in their respective substitute locations ESi, where the integer i is variable and limited in practice to several thousand. In practice, it is a question of conserving, at the emulated server SEM, the attributes of a large number i of the files Fi, the attributes being for example: the name of the file owner, the size of the file, the addresses of the data, the date of the last change to the file etc.

The emulated server has a cache memory with a capacity of the order of 128 kilobytes variable according to the application.

The working of the method according to the invention when the emulated server plays the part of a cache memory is as follows.

At step 110, the requests for consultion REQ are intercepted by a mechanism INT for example of the type LOOP BACK available in the IP protocol. Only the requests of the type "look up, read link and getattr" are capable of being intercepted. The other requests are transmitted directly to the distant server.

At step 120 the emulated server receives the intercepted request and accesses the auxiliary file.

If the condition key for the desired file is correct, that is to say, if the desired file is contained in the cache memory (Fi in ESi) it processes the request with the substitute location ESi (step 140), that is to say, the response RES is given by the local emulated server.

If not (step 150) the request is transmitted to the distant server of which the response RES (step 160) is stored (step 170) in the cache memory of the emulated server.

If the file Fi is at the distant server, the desired file is stored in the substitute location ESi of the emulated server. If not, information relating to this absence of the file Fi in the distant server is stored in the emulated server.

It should be noted that this mechanism limits very considerably the use of the distant server. However, it poses a problem of synchronisation if the files on the distant server are modified.

To secure this indispensable synchronisation, according to the invention, an auxiliary file is maintained representing a correspondence between a designation of a resource file and, on the one hand, a substitute location ESi for it and on the other hand a condition key for use by the substitute location.

In the framework of the cache memory, the condition key for use by the substitute location of a resource file is the availability and the obsolescence of the said file.

The server is arranged to maintain the auxiliary file according to every modification made to a resource file stored at the server station.

In another connection, data exchange on the network is provided at the initiative of the client station for consulting the auxiliary file of the server station and for retrieving the substitute locations of the or each emulated server according to the state of the said auxiliary file.

Figure 3:
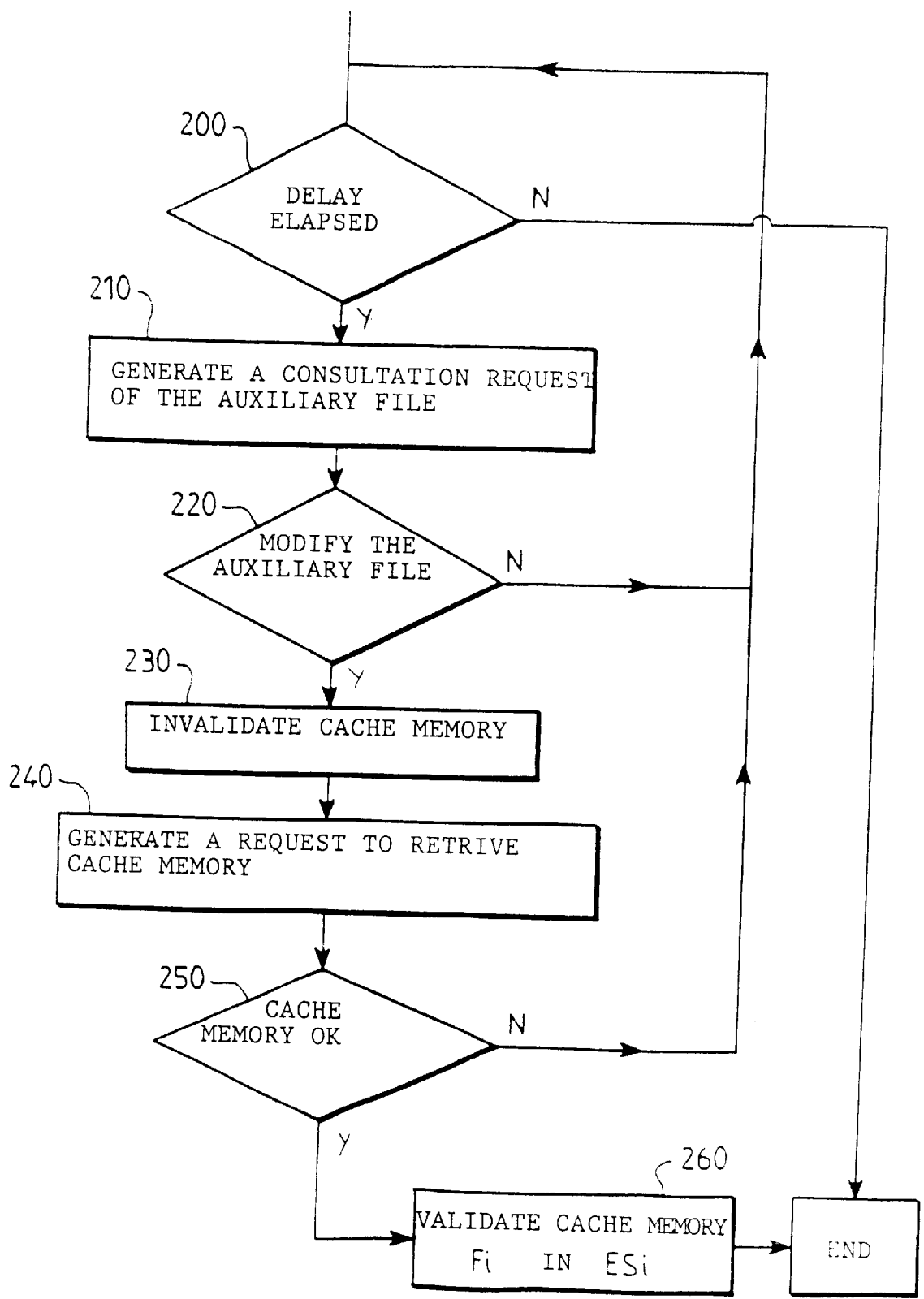
FIG. 3 is a flow chart showing the steps for validation of the cache memory according to the state of the auxiliary file according to the invention.

In a more precise manner, the step necessary for maintaining the auxiliary file comprises the following steps (FIG. 3):

at the server station, changing the auxiliary file for every modification made to at least one resource file stored on the server station;

at the emulated server (step 200), after a predetermined delay or a predetermined event, generating a request for consultation of the auxiliary file at the distant server (step 210);

at the distant server, receiving the request for consulting the auxiliary file and sending a response representing the state of the auxiliary file according to its state at the time of the previous request for consultation of the auxiliary file (step 220);

at the emulated server, for a response representing a difference in the state of the auxiliary file with regard to its previous state, invalidating the whole of the cache memory containing the copy of the resource file (step 230), and generating a request for retrieving the cache memory from the distant server (step 240);

at the distant server, receiving the request for retrieving the contents of the cache memory of the emulated server and sending the contents of the file to the emulated server (step 250);

finally, at the emulated server, for a response representing equality of the state of the auxiliary file with regard to its previous state, or in reply to the retrieval of the cache memory coming from the distant server, validating the local representation of the resource file (step 260).

In practice, the state of the auxiliary file is requested periodically (with variable frequency, in practice every 128 requests or every thirty seconds of activity) by the local emulated server to the distant server by, for example, a request of the type getattr. If the state of the auxiliary file changes, the cache memory is considered empty and the process of storage in the cache memory starts.

It should be noted that a simple change to the auxiliary file on the distant server achieves retrieval for all the clients with a maximum delay of thirty seconds.

Figure 4:
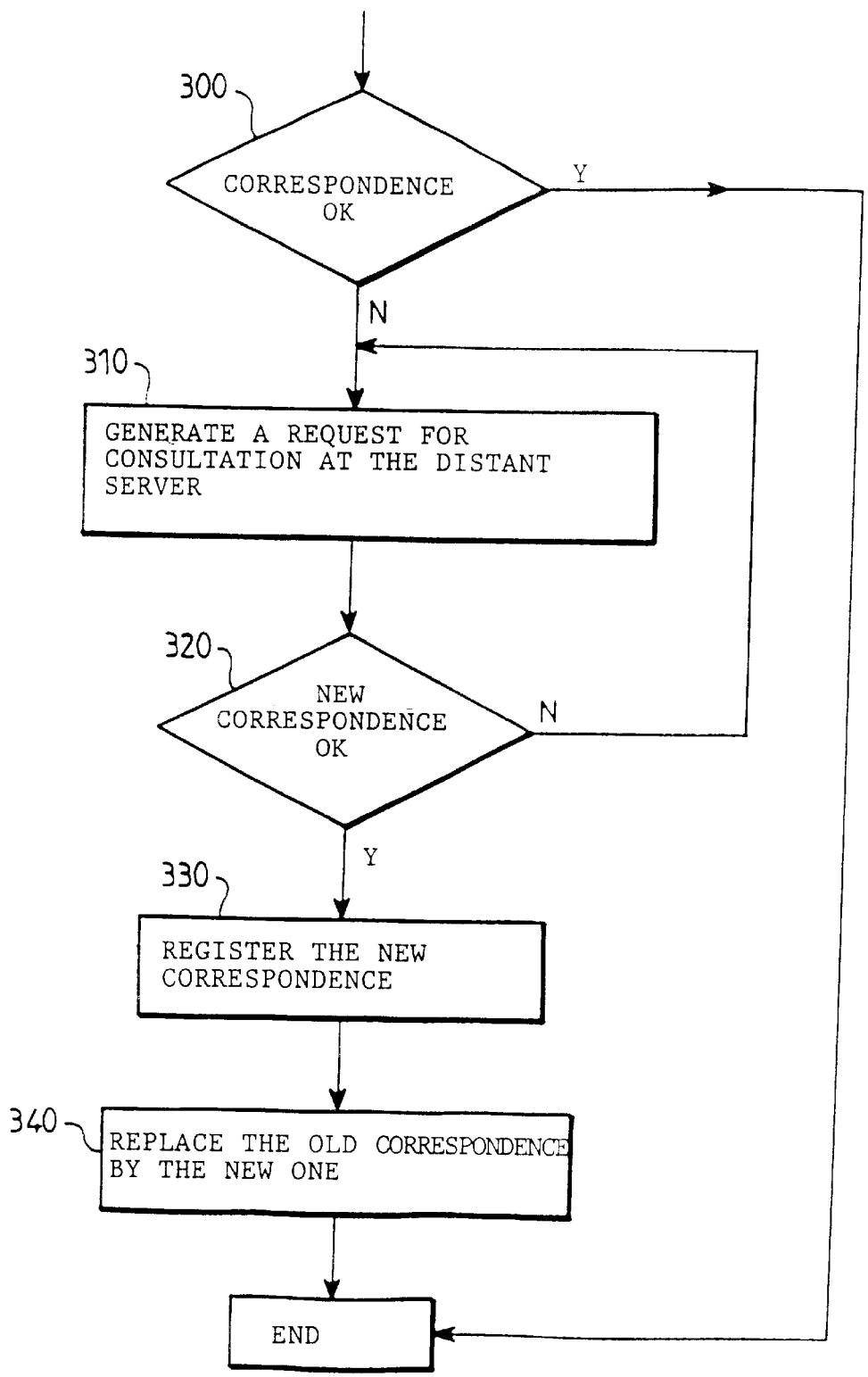
FIG. 4 is a flow chart showing the steps for operation of the emulated server playing the part of a switch according to the invention.

FIG. 4 shows a flowchart which illustrates the method according to the invention in which the emulated server plays the role of a switch.

Briefly, if two or more servers are provided in a given branched chain, the emulated server is able, if the distant server does not answer when it is addressed, to refer the same request to another server. This is made possible according to the invention by that fact that the labels distributed by the local server are wholly independent of the distant server.

To obtain this independence, and to enable communication with the distant server, the local emulated server maintains a correspondence table between the labels which it distributes and those effectively provided by the servers. This table is constructed dynamically as a function of the look up requests generated by the client.

More precisely, at least one other server station is provided, and in this is stored at least a part of the resource files in their respective substitute location according to the chosen branched chain.

The condition key for use by the substitute location of a resource file is defined by establishing a correspondence between the said substitute location and the designation of the resource file.

Finally, an auxiliary file is maintained at the emulated server, according to every modifications brought to the said correspondence between the substitute location and the designation of the resource file.

It is necessary to note that the auxiliary file is here maintained at the emulated server, whereas it is maintained at the distant server when the local server plays the part of the cache memory.

In practice, maintaining the auxiliary file at the emulated server comprises the following steps (FIG. 4);

at the emulated server, if a correspondence is not established between the substitute location and the designation of the resource file (step 300), a request for consulting the file at the distant server is generated (step 310);

the request for consultation is received at the distant server and the new correspondence between the substitute location and the designation of the resource file is consulted. This new correspondence is obtained due to the designation of the resource file accompanying the request for consultation. The new correspondence is then transmitted to the emulated server (step 320):

finally, the emulated server receives and registers the new correspondence (step 330), and replaces, in the request for consultation of the file, the old correspondence with the new correspondence (step 340).

It should be noted that the two functions of cache memory and switch described above are totally independent of each other and can therefore operate separately. They are for example set up in layers 5 or 6 of the OSI standard.

In a general way, where the emulated server acts as a cache memory, a simple program is interposed at the client station which permits, without modification of the operating system, a reduction in the waiting time by the client and thus a reduction in the load on the server. This result is obtained mainly by the creation of the auxiliary file for synchronisation at the server, which allows synchronisation of all the clients to be achieved.

Where the emulated server acts as a switch, a simple program is interposed at the client station which allows, without modification of the operating system, distribution of labels independent of the server, and thus the ability to address several servers.

I claim:

1. A method for information exchange in the client-server mode between stations connected by a communication network, in which:
    a network is formed by a communication hub and a plurality of stations each associated with a coupler on the hub,
    at least one server station is arranged on the network,
    each coupler is provided with a network communication protocol, allowing the processing of requests (REQ) for consulting a resource file (Fi) between client stations and the server station,
    wherein said method comprises the following steps:
    at at least one client station,
    maintaining locally an auxiliary file representing a correspondence between a designation of the resource file, a substitute location (ESi) for the resource file, and a condition key for use by the substitute location (ESi),
    providing an emulated server (SEM) to communicate according to the protocol for processing requests for consulting a resource file at the initiative of the emulated server,
    at a coupler between the at least one client station and the network, providing a mechanism (INT) for intercepting a request for consulting the resource file, by redirecting the request to the local emulated server (SEM),
    at the emulated server (SEM), accessing the auxiliary file and receiving an intercepted request; and
    if the condition key for the requested resource file is correct, processing the request with the substitute location (ESi), and, if not, directing to the server station a derived request to obtain access to the requested resource file.

2. A method according to claim 1, further comprising the following steps:
    at the server station, ordering the resource file (Fi) according to a chosen branched chain,
    at the emulated server (SEM), storing at least a part of the resource file (Fi) in a respective substitute location (ESi) in a cache memory,
    defining the condition key for use by the substitute location of the resource file according to the availability and the obsolescence of the resource file,
    maintaining the auxiliary file at the server station, according to every modification made to the resource file stored at the server station,
    providing data exchanges on the network, at the initiative of the client station, for consulting of the auxiliary file at the server station and for retrieving the substitute locations (ESi) of the or each emulated server (SEM) according to the state of the auxiliary file.

3. A method according to claim 2, wherein the step of maintaining the auxiliary file at the server station is comprised of:
    at the server station, modifying the auxiliary file for every modification made to the resource file stored at the server station, and
    wherein the step of providing data exchanges on the network is comprised of:
    at the emulated server (SEM), after a predetermined delay or a predetermined event, generating a request for consultation of the auxiliary file at the server station,
    at the server station, receiving the request for consulting the auxiliary file and sending a response representing the state of the auxiliary file at the time of the previous request for consultation of the auxiliary file,
    at the emulated server, for a response representing a difference between a present state of the auxiliary file and a previous state, invalidating the whole cache memory containing the copy of the resource file, and generating a request for retrieval of the cache memory at the server station,
    at the server station receiving the request for retrieval of the cache memory of the emulated server and sending the contents of the desired resource file to the emulated server, and
    at the emulated server, for an answer representing equality of the present state of the auxiliary file and the previous state, or in response to retrieval of the cache memory from the server station, validating the local representation of the resource file.

4. A method according to claim 1, further comprising the following steps:
    at the server station, ordering the resource files according to a chosen branched chain,
    providing at least one other server station and storing in the at least one other server station the resource file in a respective substitute location according to the chosen branched chain, defining the condition key for use by the substitute location and the designation of the resource file, and maintaining the auxiliary file at the emulated server, according to every modification made to the correspondence between the substitute location and the designation of the resource file.

5. A method according to claim 4, wherein the step of maintaining the auxiliary file at the emulated server is comprised of:

at the emulated server, where a correspondence is not established, generating a request for consultation of the file at one of the server stations at which the resource file is located, at the server station at which the resource file is located, receiving the request for consultation, consulting a new correspondence between the substitute location and the designation of the resource file, obtained due to the designation of the resource file accompanying the request for consultation, and sending the new correspondence to the emulated server, at the emulated server, receiving and registering in the correspondence table, the new correspondence between the substitute location and the designation of the resource file, and replacing the old correspondence with the new correspondence in the request for consultation of the file.

6. The method according to claim 1, wherein the network communication protocol is internet protocol.

7. The method according to claim 2, wherein the network communication protocol is internet protocol.

8. The method according to claim 3, wherein the network communication protocol is internet protocol.

9. The method according to claim 4, wherein the network communication protocol is internet protocol.

10. The method according to claim 5, wherein the network communication protocol is internet protocol.

* * * * *